United States Patent [19]

Neukam

[11] Patent Number: 5,027,684

[45] Date of Patent: Jul. 2, 1991

[54] COLLAR FOR MOUNTING A SPLIT SAW BLADE ON AN ARBOR

[75] Inventor: Russell E. Neukam, Huntingburg, Ind.

[73] Assignee: North American Products Corp., Jasper, Ind.

[21] Appl. No.: 535,570

[22] Filed: Jun. 11, 1990

[51] Int. Cl.⁵ .................................................. B23D 19/00
[52] U.S. Cl. ........................................ 83/481; 83/665; 83/699
[58] Field of Search ................. 83/665, 666, 676, 699, 83/663, 698, 838, 481; 403/344; 51/168, 169

[56] References Cited

U.S. PATENT DOCUMENTS

| | | | |
|---|---|---|---|
| 2,846,826 | 8/1958 | Miller | 51/168 |
| 2,920,894 | 1/1960 | Kreinick | 51/168 X |
| 3,656,393 | 4/1972 | Goellner | 83/666 |
| 3,908,499 | 9/1975 | Reed | 83/665 |
| 4,221,497 | 9/1980 | Farrel | 83/665 X |
| 4,502,357 | 3/1985 | Hussissian | 83/676 X |

Primary Examiner—Frank T. Yost
Assistant Examiner—Kenneth E. Peterson
Attorney, Agent, or Firm—Nilles & Nilles

[57] ABSTRACT

A collar is disclosed for mounting a radially separable cutting tool in installed concentrically on an arbor. The cutting tool is comprised of individual sectors that are radially separable, have inner edges that coact to define a center arbor receiving bore and apertures radially spaced from the inner edges for loosely receiving pins therein. The collar includes an annular flange having axially outer and inner faces and a bore for receiving the arbor therethrough. A plurality of pins are mounted in the collar flange and dimensional to loosely fit in the apertures in the cutter tool sectors. The pins project axially beyond the inner face and are movable radially toward and away from the bore for contact with the sectors mounted thereon to enable the pins to precisely move each sector into installed concentricity with the bore. A clamping mechanism is provided to clamp the cutter tool sectors against the inner face to maintain the sectors in installed concentricity.

11 Claims, 4 Drawing Sheets

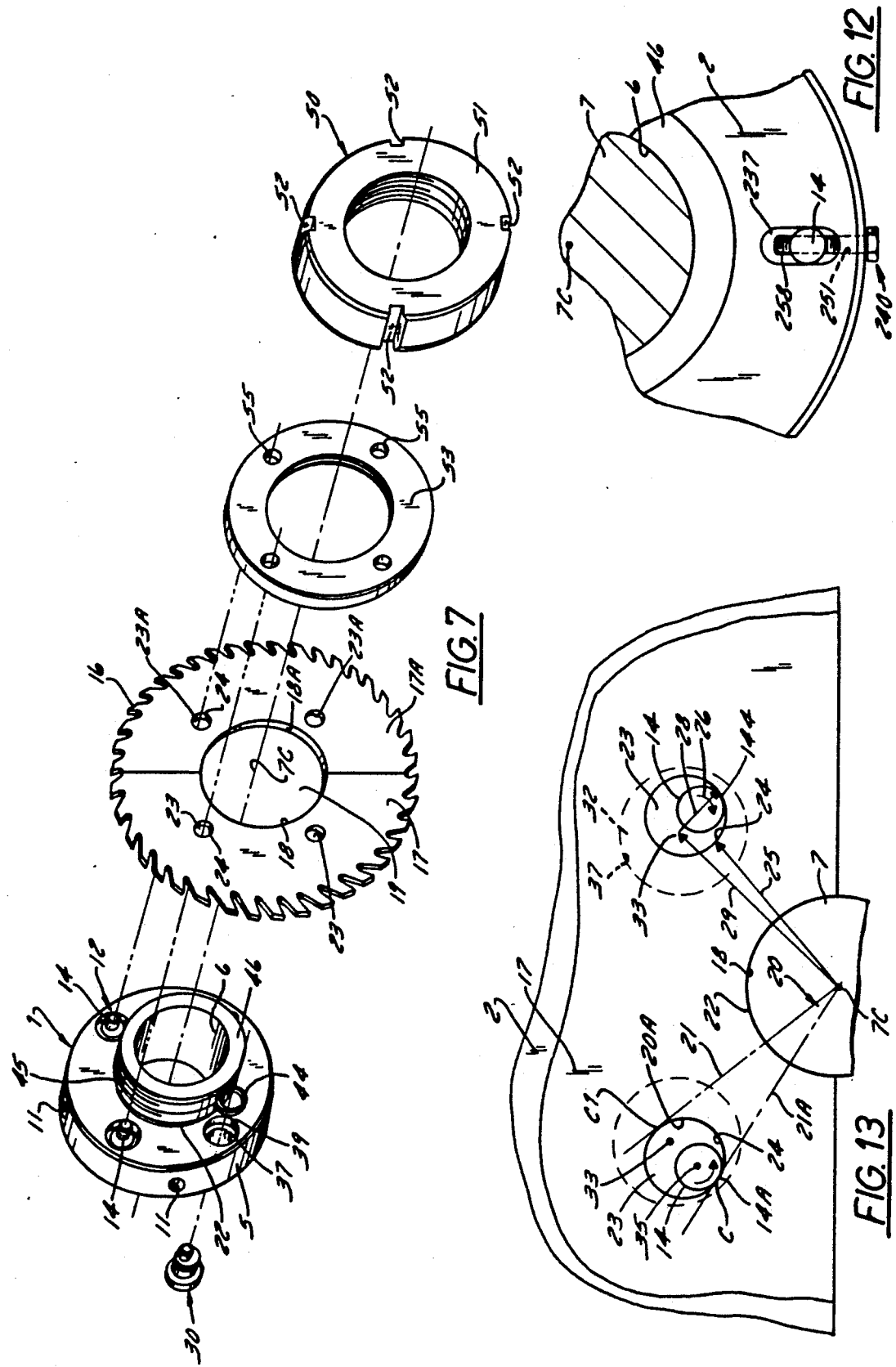

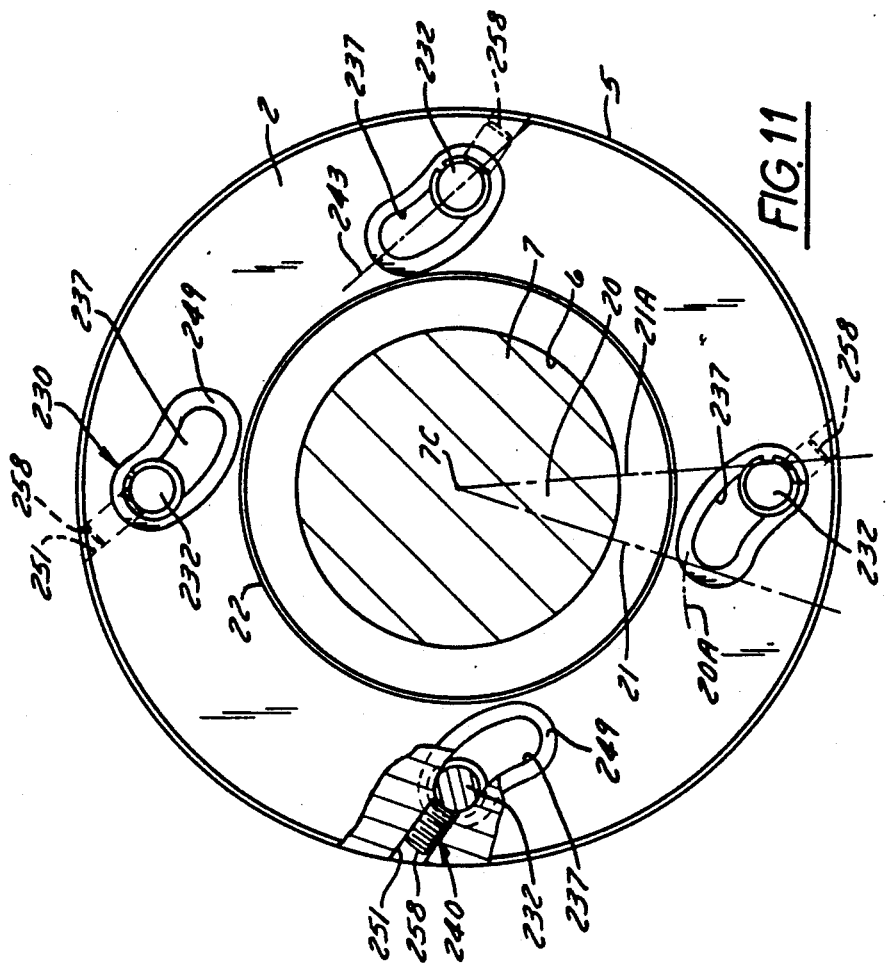
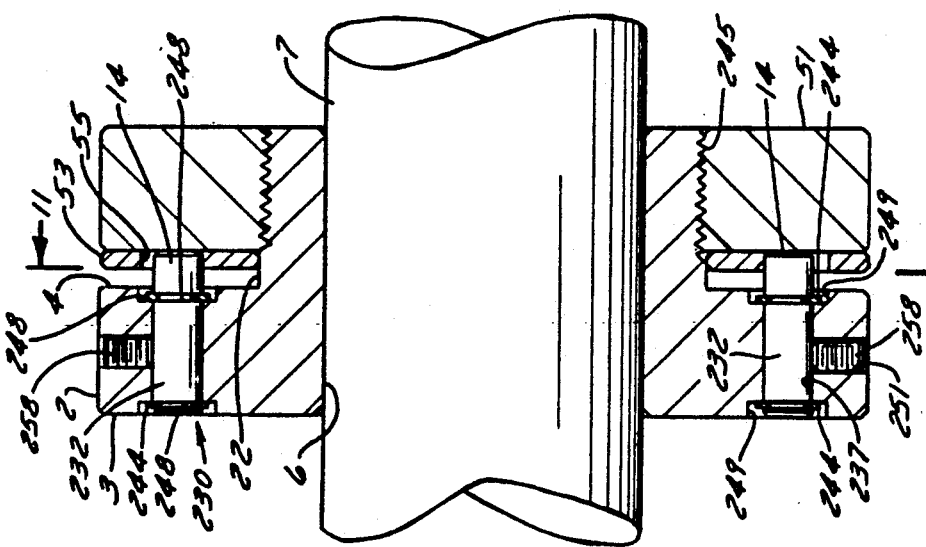

COLLAR FOR MOUNTING A SPLIT SAW BLADE ON AN ARBOR

BACKGROUND OF THE INVENTION

1. Field of the Invention

This invention relates to a collar for mounting a radially separable circular cutting tool such as a split saw blade on a rotatable arbor and more specifically to a collar that will mount and hold the split saw blade in precise installed concentricity with the arbor.

2. Background of the Invention

In industries such as woodworking it is a normal practice to mount a plurality of individual circular cutting tools such as saw blades on a single driven arbor in axially spaced relation to each other. Such arrangements are commonly referred to as gang saws and a gang saw may include as many as twenty or thirty circular saw blades on a single arbor eight to ten feet in length. The purpose of a gang saw is to simultaneously cut a single wide piece of work stock into a plurality of narrower strips with only a single pass of the work stock through the gang saw. The saw blades comprising the gang saw must be removable from the arbor for replacement when damaged or for servicing such as sharpening. Because there is a plurality of bearing supports for the arbor and a drive connection to the arbor, it is not practical to slide all of the individual saw blades off the arbor when servicing is required, and even if done, it is a difficult and slow process when twenty or thirty blades are involved. The practice most often followed is to have a second replacement arbor completely assembled with bearings and sharpened saw blades. When the existing blades in the gang saw require service, the arbor is removed with all the blades thereon and the replacement arbor put in its place.

The disadvantages of removing the entire arbor are many. The user must, of course, incur the expense of purchasing two arbors, two sets of bearings and two sets of saw blades. The arbor may be up to 10 feet in length and with saw blades and bearings thereon, weigh 300 to 500 lbs. This weight requires a winch and two service people for removal. Obviously such service is slow, difficult and results in substantial downtime with subsequent lost production. There are also numerous occasions when only one circular saw in the center of the gang saw is damaged. Removal of the entire arbor to service only one blade is very unsatisfactory from a cost of service standpoint.

To minimize the need to remove the arbor or a plurality of the saw blades to get at one damaged blade, it is known to split each circular saw blade diametrically into two radially separable semicircular sectors. Such a blade is called a split saw blade. The arbor in turn is provided with a plurality of special collars, one for mounting the halves of each split saw blade on the arbor. The blades can be bolted to a flange of the collar or the collar may have axially extending driving pins therein that are radially spaced from a center arbor bore defined by the split saw blade sectors. In this latter case the split saw blades have sets of pin receiving apertures enabling them to be slid axially onto the driving pins of an open collar, and then clamped into the collar by a suitable clamping means such as a nut. The use of split saw blades and collars solves the problem of how to remove an individual saw blade without removing the entire arbor or disturbing any other saw blades thereon. However, split saw blades also introduce new problems such as concentricity and ease of removal and installation of the split saw blades.

At this point it will be helpful to define the various meanings of the word "concentricity" because the word "concentricity", when used alone relative to a saw blade, can imply several different meanings. Every tooth of a newly manufactured circular saw blade is at precisely the same distance from the center of the arbor bore in the blade. This will be referred to as "manufactured concentricity". The split saw blade sectors while being installed can move radially relative to each other and to the arbor shaft or collar and when installed normally have a concentricity which is less accurate than the manufactured concentricity of the new split saw blade. This will be termed "installed concentricity" or "installed nonconcentricity". When split saw blades are removed for sharpening, they are clamped in a jig and sharpened concentric to the jig. This is termed "resharpened concentricity". The goal, of course, of all split saw installations is to provide an installed concentricity which is as close as possible to the manufactured concentricity or the resharpened concentricity.

It is extremely important that the split saw blade sectors be installed and held in installed concentricity with the arbor. Poor installed concentricity generates a host of long-standing, well known problems, all of which have expensive consequences. A nonconcentric blade has some teeth closer and some teeth farther from the arbor center, creating an imbalance. High speed rotation of an unbalanced blade causes it to "jump" as it rotates around the arbor center resulting in: arbor vibration; accelerated arbor bearing wear; more arbor fatigue breakage; uneven wear of the saw teeth because teeth closest to the arbor take light or no cuts while those teeth farthest from the center take heavy cuts and do most of the cutting; generation of heat in the saw blade making it likely that the blade will distort; and more noise. Distortion requires saw smithing—the hammering of a blade back into a flat condition—and this is extremely difficult with split saw blades. Vibration due to installed nonconcentricity causes the split saw blades to deviate from a true cutting path resulting in more chattering of the work piece and a rougher finish to the cut edges. The vibrating saw blade also cuts a wider kerf which creates more waste material and increases the power requirements of the gang saw.

An unsplit conventional circular saw blade with a center bore includes teeth thereon that have manufactured concentricity with the arbor on which it is mounted. An unsplit circular saw blade does not experience the problems discussed above because it cannot be radially separated to present installed nonconcentricity. Further, it is easy to manufacture an arbor bore in the circular blade that has a close installation tolerance, the clearance between the arbor and the blade bore, which will permit an easy sliding installation of the blade onto the arbor because the blade need only index itself to a single reference location provided by the arbor. This will be called "installation tolerance" and every blade must have this tolerance.

A split saw blade, on the other hand, is inherently different in that the arbor bore is radially separable. Because the split saw blade comprises two independent sectors, it has always been thought necessary that each sector must have a plurality of reference locations to enable it to be accurately installed on the arbor. Therefore it has been the practice to provide each sector with two or more reference locations to facilitate its installation in the collar. Specifically, prior art collars position each of the blade sectors relative to the center of the arbor axis by indexing each blade sector on a plurality of reference locations comprising the arbor and usually two driving pins or mounting bolts. Thus, normally there are three reference locations in a collar which must be accommodated by each blade sector. In theory it would seem simple to so precisely locate the sets of driving pin apertures and arbor bore in the split saw blade halves that installed concentricity will be the same as manufactured concentricity when the split saw sectors are slid onto the collar pins. In practice, with a multiplicity of reference locations it has proved to be impossible to achieve an installed concentricity which is the same as manufactured concentricity. As discussed above, the split saw blade sectors must be able to be easily slid axially onto and off of the driving pins and fit around the arbor or a center shaft of the collar, and this necessitates an installation tolerance between a plurality of reference locations such as the pins, saw blade pin holes and arbor. This installation tolerance always results in some looseness or play between components. When two saw blade sectors each have a plurality of reference locations that must be accommodated, a greater amount of play is required and the problem of achieving installed concentricity is greatly complicated. This play permits the saw blade sectors to inadvertently slip radially outward or inward while being clamped into the collar. Experience shows that it is not possible for the installers to know exactly where the blade should be located for best concentricity and further even if they did know they cannot force and hold the split saw blades in installed concentricity during installation. The split saw blades are large, weigh up to six pounds and normally require two service people for installation and removal. The installers are under pressure to get the job done quickly. One sector or the other invariably slips. Clamping jigs to hold the sectors are unwieldly, tend not to be used because they slow down the service people and, even when used, tightening the collar clamping means frequently causes the sectors to shift a minute unnoticed amount within the jig. The incredibly close tolerances that would be required to eliminate this play, while still allowing a free and easy sliding installation of the split saw blades on a plurality of reference locations, would increase the manufacturing costs to prohibitive levels. Further, with such close tolerances, minute nicks and burrs on the pins and saw blade apertures would prevent the blade sectors from slipping easily onto the pins.

To minimize manufacturing costs and the amount of installed nonconcentricity, while providing safety, it is known to manufacture a conventional circular saw blade with an arbor bore; mount an axially projecting circular hub on at least one side of the blade around the arbor bore usually by riveting; precisely machine this hub; and then cut the blade diametrically into two halves to produce a hubbed split saw blade. The collar for mounting hubbed split saw blades on the arbor is provided with precisely machined internal annular trepanned recesses into which the hubs fit. The outer periphery of the hub will abut the inner periphery of the trepanned recess to limit the amount of installed nonconcentricity that can occur during installation. Such a collar is termed a trepanned collar. Installing the hub on the blade and machining it increases the cost of the blade by as much as 50%. While the operating safety of such an assembly is excellent, installed concentricity remains poor because suitable installation tolerances must still be provided to allow the hub of each split saw blade sector to be easily slid into the trepanned recess in the collar. Two service people are still required, one to try to hold the blade halves and the other to tighten the collar. When removing the blades, one service person releases the collar while the other holds the saw blades to keep them from falling out of the collar onto the bed of the machine with probable resultant chipping or breaking of the carbide teeth on the sectors. The hubbed split saw presents installed concentricity problems because each half of the hubbed saw blade will only compressively seat against the inner peripheral surface of the trepanned recess in the collar when substantial centrifugal force is applied and this force is not created during normal static installation nor during placement of the sectors in a sharpening jib. Invariably during installation, gravity causes one of the sectors to move inward toward the arbor while the other sector moves radially outward against the inner periphery of the trepanned recess of the collar resulting in installed nonconcentricity.

Mounting a new split circular saw blade so that it will have installed concentricity has in the past proven to be virtually impossible. The use of the plurality of pins or bolts and resultant play required by installation tolerances makes it impossible to accurately position split saw blade sectors by indexing them with reference to the pins or bolts. Therefore, prior collars have not permitted the translation of the manufactured concentricity into installed concentricity. Further, when the split saw halves are to be resharpened they must then be clamped into a sharpening jig which holds the split saw blade halves concentric with a center. However, the jig also must have the same plurality of reference locations but they are never quite the same dimensionally as those of the collars on which the blade halves are mounted and the installed concentricity of resharpened blades is not as good as the resharpened concentricity. The only technique heretofore known to maximize installed concentricity is to sharpen or resharpen the split saw halves while they are clamped in the same collar that is used to mount them when they are in actual use. This is unsatisfactory because when resharpening is required the end user must remove both the collar and the blades from the arbor and send them to the resharpener for sharpening. This is very time-consuming and adds to the expense of service, but this technique is still actually being used in some instances in an attempt to solve the installed concentricity problem when a collar must be used. After sharpening, the end user must reinstall the collar without loosening or removing the split saw blades from the collar as such removal will destroy the installed concentricity of the split saw blades.

The prior art discloses various arrangements for adjusting the position of an unsplit circular cutting tool or the cutting teeth thereon relative to the arbor on which the blade is mounted. U.S. Pat. No. 3,656,393 to Willy J. Goellner discloses a carbide blade locking device wherein two driving and locking pins each have an eccentric head portion engaging apertures in an unsplit circular saw blade to adjust the entire unsplit saw blade circumferentially into firm engagement with the pins to prevent any backlash of the blade. U.S. Pat. No. 139,544 to S. W. Clemmens discloses a circular saw blade mounting collar having adjusting screws in spaced parallel relation to the arbor for tilting an unsplit circular saw blade into a perfect right angle relationship to the axis of the arbor. U.S. Pat. No. 4,706,531 to Wilfried Blauhut et al discloses a device for cutting strand shaped material wherein the cutting angle of the cutter blades can be individually adjusted.

This prior art does not deal with the problem of mounting the radially separable sectors of a cutting tool on an arbor so that the installed concentricity of the sectors will be virtually the same as the manufactured or resharpened concentricity of the sectors.

Split saw blade installations and their associated problems as discussed above have existed for more than 35 years without a satisfactory solution. As a matter of historical fact, the prior art relating to mounting unsplit saw blades did not render the present invention obvious to those skilled in the art because the problems persisted unsolved and troublesome for at least 35 years. Therefore in the present state of the art relating to the mounting of split saw blades prior to the present invention, the problem of providing an installed concentricity for split saw blades still exists inspite of long-standing efforts to eliminate it. Because of a lack of a solution, the manufacture and servicing of split saw blades remains very expensive and the known disadvantages are endured by end users of gang saws.

SUMMARY OF THE INVENTION

The present invention provides an improved collar that will permit a radially separable cutting tool such as a split circular saw blade to be mounted on an arbor so as to have an installed concentricity which is virtually identical to its manufactured or resharpened concentricity.

Specifically, the invention resides in a collar comprising an annular flange having axially spaced apart outer and inner face portions and an axial bore dimensioned to receive an arbor therethrough. The collar is provided with pin means that are loosely insertable in pin receiving apertures in the split saw blade sectors that are to be mounted in the collar. An adjusting means is provided in the flange for mounting each of the pin means in radially spaced relation to the collar bore so as to project axially beyond the inner face. The adjusting means is operable to move the pin means radially toward and away from the bore. This radial movement enables the position of any split circular blade sector mounted in the collar to be radially moved and adjusted so as to have an installed concentricity that is the same as the manufactured concentricity of the split saw blade as originally manufactured or as resharpened. The adjusting means for moving each of the pin means radially may comprise a rotatable cam means in the flange.

In another embodiment each pin is mounted on a pin body. The adjusting means comprises a pin body receiving slot in the flange. The pin body is mounted in the slot with the pin projecting beyond the inner face of the flange for travel along the slot to move the pin radially toward and away from the axial bore. An actuating means is mounted in the flange to move the pin body. The actuating means may include a threaded bore extending inward from the outer circumferential portion of the flange to the slot. An adjusting screw is threaded into the threaded bore. Rotation of the adjusting screw will cause the pin means associated therewith to move radially toward or away from the arbor.

It is an object of this invention to provide a collar that is low in cost to manufacture, reliable in use, and capable of radially adjusting any type of radially separable cutting tool into installed concentricity with the arbor on which the collar is mounted.

Another object of this invention is to provide a collar which will enable a single service person to install radially split saw sectors on an arbor to achieve installed concentricity.

It is a further object of this invention to provide a collar for mounting split saw blade sectors of the type that do not have a center hub around the arbor bore to reduce the cost of saw blades used in split saw installations.

BRIEF DESCRIPTION OF THE DRAWINGS

Referring to the drawings:

FIG. 7 is an exploded view of the collar shown in FIG. 1;

FIG. 10 is a side elevational view in section shoWing a collar according to the present invention incorporating a third embodiment of the adjusting means;

FIG. 11 is a sectional view taken along line 11—11 of FIG. 10;

FIG. 12 is an enlarged partial view of the collar of FIG. 11 showing a modified form of the third embodiment of the adjusting means; and FIG. 13 is an enlarged partial view of the collar shown in FIG. 4.

DESCRIPTION OF THE PREFERRED EMBODIMENTS

Figure 1:
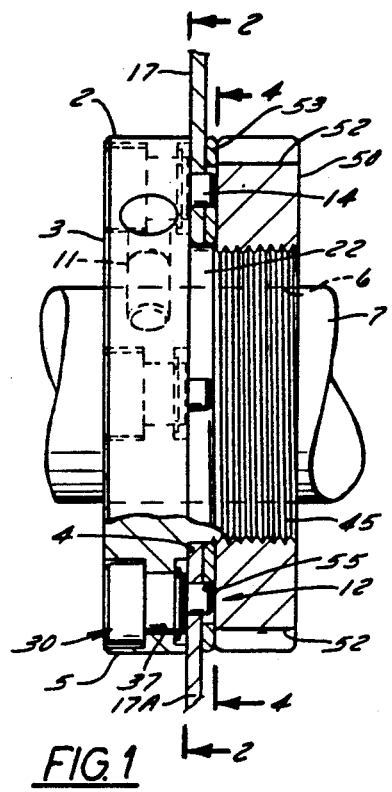
FIG. 1 is a side elevational view, partly in section, parallel to the axis of an arbor showing a collar incorporating the present invention.
Figure 2:
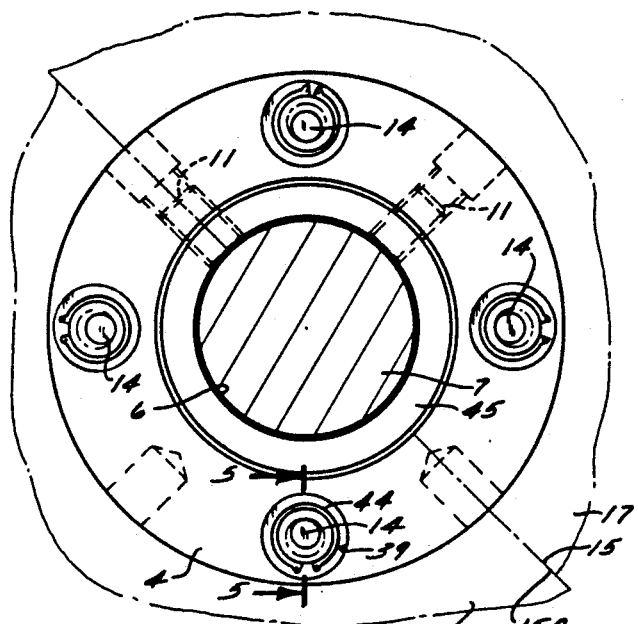
FIG. 2 is a sectional view taken on line 2—2 of the collar FIG. 1.
Figure 3:
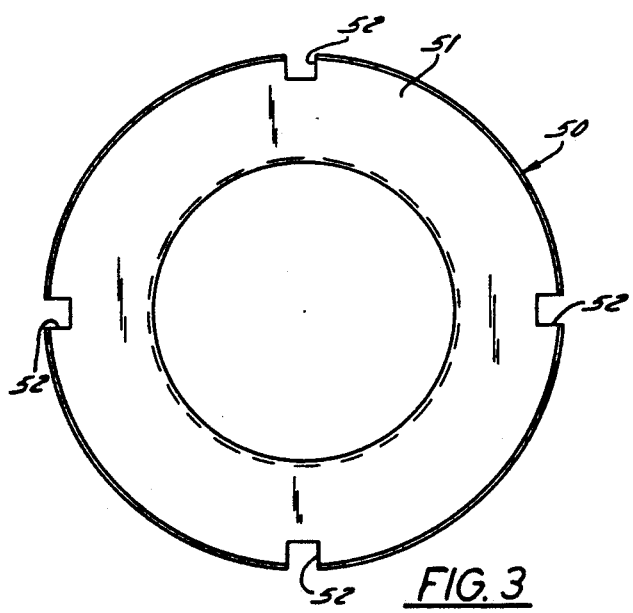
FIG. 3 is a front end view of a clamping nut of the collar shown in FIG. 1.

Referring to FIGS. 1, 2, 4 and 7, the collar 1 comrises an annular flange 2 having axially spaced apart outer and inner flange faces 3 and 4. The flange 2 is preferably circular as viewed in elevation, having an outer circumferential portion 5 and an axial bore 6 dimensioned to receive an arbor 7 therethrough when the collar is in an installed condition in a gang saw. The flange 2 is provided with two radial set screws 11 for locking the collar in position on the arbor.

A pin means 12 is provided in the collar flange 2, and preferably comprises four pins 14. As shown in FIG. 7, a split saw blade 16 is formed of two semicircular sectors 17, 17A. While more than two sectors could be used, past experience has shown that splitting the saw blade into more than two sectors is not necessary. The sectors 17, 17A each have inner edges 18, 18A that coact to define a center split saw blade bore 19 for receiving the arbor therethrough. As shown in FIG. 7, the sectors 17, 17A have first and second sets of pin receiving apertures 23, 23A, respectively. Each set of apertures will comprise one or more and preferably two circumferentially spaced apertures 23, 23A. Each of the apertures 23A has an inner periphery 24. The pins 14 and apertures 23A are dimensioned so that each pin will fit loosely in its associated aperture, as will be described hereinafter with reference to FIG. 12. Each pin 14 is eccentrically mounted and when rotated in the direction of arrows 26 (FIG. 4) as will be described, it will contact the inner periphery 24 of its associated aperture 24 and continued rotation will then move the sector radially. The use of two apertures 23 and 23A in each sector, spaced 90° apart will prevent any tendency of the sector to seesaw when the inner edges 18, 18A thereon are drawn or forced into contact with a mating reference location 22 of the collar. The reference location 22 could be on the arbor on which the collar is mounted as will be more fully explained hereinafter.

Three embodiments of an adjusting means for moving pins 14 radially inward and outward are disclosed and identified by reference numbers 30, 130 and 230. As each embodiment comprises four identical individual adjusting means, only one adjusting means of each embodiment will be described. The adjusting means of each embodiment is located in the flange 2 for mounting each of the pins 14 in radially spaced relation to the flange bore 6. The adjusting means also mounts each of the pins 14 to project axially beyond the inner face 4 and for movement radially toward and away from the bore 6.

Figure 6:
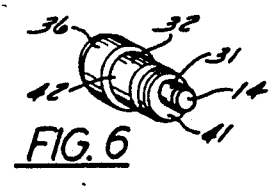
FIG. 6 is an isometric projection view of a cam pin used in the adjusting means shown in FIG. 5.
Figure 5:
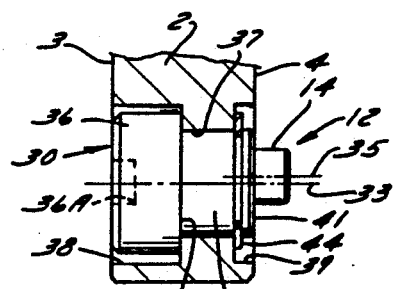
FIG. 5 is a partial view, in section, taken along line 5—5 of FIG. 2 showing a first embodiment of an adjusting means.

The first embodiment 30 of the adjusting means is shown in FIGS. 5 and 6. The first embodiment comprises a cam means 31 which includes a cam body 32 having a cam body axis 33 and inner and outer ends 41, 42. A rotation imparting means in the form of enlarged head 36 having a hexagonal wrench receiving socket 36A is formed on the outer end 42 of the cam body. The pin means 14 is mounted to project from the inner end 41 of the cam body and has a pin axis 35 which is spaced parallel to the body axis 33 and thus is eccentric to the cam body axis 33 when the cam body is rotated. The annular flange 2 includes a plurality of cam body receiving openings 37 extending therethrough from the outer to the inner face. Each opening 37 is radially spaced from the axis bore 6 and has enlarged counterbores 38 and 39 (FIG. 5) at the outer and inner surfaces 3 and 4. Each cam body 32 is rotatably mounted directly in the openings 37 of flange 2 as shown in FIG. 5 and retained by a snap ring 44.

Figure 8:
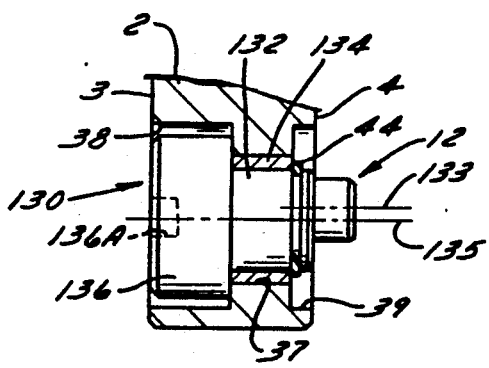
FIG. 8 shows a second embodiment of the adjusting means.
Figure 9:
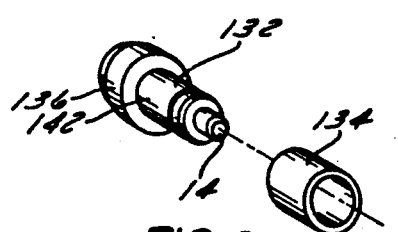
FIG. 9 is an isometric projection view of a cam pin and bushing used in the adjusting means shown in FIG. 8.

FIGS. 8 and 9 show a second embodiment 130 of the adjusting means. The second embodiment differs from the first embodiment in that the cam body 132 is rotatably mounted in a cam bushing 134 which has a press fit in one of the openings 37 in flange 2. The outer end 142 of the cam body 132 is provided with any suitable type of rotation imparting means such as enlarged head 136 having a socket 136A for receiving a hexagonal wrench. The enlarged head 136 seats in the counterbore 38. The pin means 14 projects from the inner end 141 of the cam body. A snap ring 44 surrounds the inner end of the cam body 132 and seats in inner counterbore 39 to hold the cam body in the aperture. The pin axis 135 is offset from the axis 133 similar to that of axes 35 and 33 of FIG. 5.

A third embodiment 230 of the adjusting means is shown in FIGS. 10, 11 and 12. The third embodiment also includes pins 14 as are used in the first two embodiments. The adjusting means 230 for the pins 14 includes a pin body 232 having spaced apart snap ring retaining grooves 248 therein. One end of the pin body 232 has an extended portion projecting beyond the inner face 4 and this extended portion constitutes the pin 14. A pin body receiving slot 237 extends axially through the flange 2 from the outer face 3 to the inner face 4. The pin body 232 is mounted in the slot 237 with the pin 14 projecting beyond the inner face 4 of the flange 2 and retained by snap rings 244 in grooves 248. The pin body is free to travel along the slot radially toward and away from the axial bore 6. The inner and outer faces of flange 2 are provided with relieved areas 249 around the outer periphery of slot 237 to accommodate the snap rings 244. The slot 237 could be tangentially inclined, as shown in FIG. 11, or straight extending radially inward, as shown in FIG. 12. To aid in releasing the pins 14 from the saw blade sectors when they are being removed, it is preferable that the slot 237 be arcuate as shown in FIG. 11, having a major straight line axis 243 that is generally tangential to the bore 6. Preferably the slots 237 will be arranged in two sets with the major axes of each slot of a set lying substantially tangential to bore 6 as shown in FIG. 11.

An actuating means 240 is provided in flange 2 for moving the pin body 232 radially toward and away from the bore. The actuating means 240 includes an internally threaded bore 251 directed inward from the outer circumferential portion 5 of the flange 2. An adjusting screw 258 is threaded into the bore 251 and operatively connected to pin body 232 to move it radially inward or outward in response to rotation of the adjusting screw.

Referring to FIG. 7 the collar flange 2 may include a center stub arbor 45, coaxial with arbor 7, projecting axially from the inner face 4. The stub arbor 45 terminates in an externally threaded distal end 46. The axial bore 6 extends through both the annular flange 2 and the stub arbor 45.

A clamping means 50 is provided for securing the blade sectors 17, 17A in their adjusted position on the collar. The clamping means may comprise an internally threaded nut 51 which is threaded on the distal end 46 of the stub arbor 45. The periphery of nut 51 is provided with slots 52 adapted to receive a spanner wrench for tightening the nut. A slip washer 53 is mounted between an inner surface of nut 51 and the inner surface 4 of flange 2. The slip washer 53 has four openings 55 spaced to loosely receive the ends of pins 14 therein. The pins 14 do not project all the way through washer 53 and do not contact nut 51.

Referring to FIG. 13, the dimensional relationships between the pin receiving apertures 23 in sector 17, the sector edge 18, the center 33 of pin body 32, the radially outermost periphery 14A of pin 14, the reference location 22 on arbor 7, and the arbor center 7C will now be discussed. It is to be understood that in the installed condition, the arbor center 7C is the same as the center of the blade sectors 17, 17A and therefore the reference 7C will be used to describe both centers. As blade sectors 17 and 17A are identical for all embodiments, the dimension relationships will be discussed only with respect to sector 17. As shown in FIG. 13, radial lines 21, 21A which extend from arbor center 7C tangentially to both sides of aperture 23 define an included angle 20. The angle 20 subtends a radially innermost edge portion 20A of the inner periphery 24 of the sector aperture 23 between contact points C and C1. In FIG. 11 showing the third embodiment, the blade sector 17 is not shown but these same dimensional relations apply and, as there shown, angle 20 subtends an arc 20A.

Figure 4:
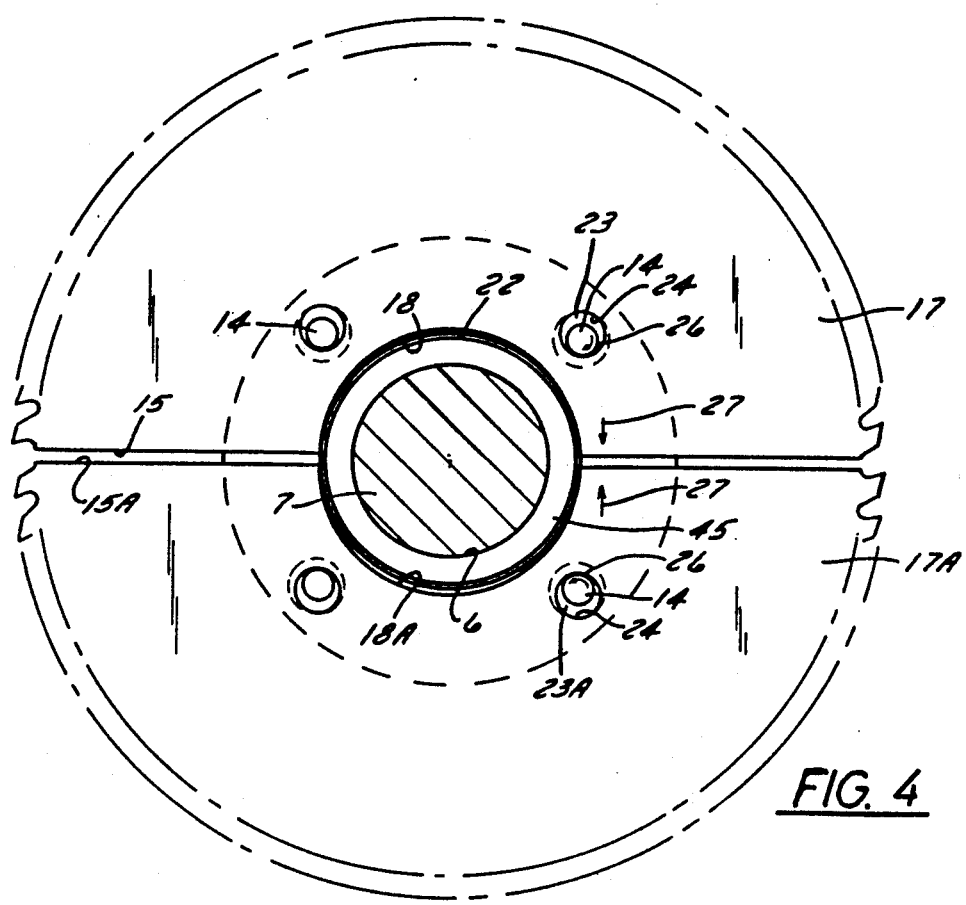
FIG. 4 is a sectional view taken along line 4—4 of FIG. 1.

Relative to sector 17, the innermost portion 20A of sector aperture 23, at a point closest to center 7C, is at a first radial distance indicated by arrow 25. With reference to pin 14, the outer periphery 14A thereof is at a second distance from the center of rotation 33 of pin body 32 that is indicated by arrow 28. The total of distances 25 and 28 when in a straight line alignment is greater than a third straight line distance indicated by arrow 29 between the center 7C of arbor 7 and the center 33 of pin body 32 in collar flange 2. Therefore, as pin body 32 is rotated, the periphery 14A of pin 14 will follow a direction as indicated by arrow 26 that has at least a radial component which will bring it into contact with the radially innermost edge portion 20A of inner periphery 24 which is the arcuate edge portion between points C and C1 closest to bore center 7C. This contact will move sector 17 and force the sector edge 18 into contact with reference surface 22 to assure concentricity. The pins 14 can be rotated relative to each other to adjust the circumference position of the sector to assure that edge 15 thereof is parallel to edge 15A of adjacent sector 17A as best seen in FIG. 4 and as will be more fully described hereinafter. In the second embodiment (FIG. 8), pin body 132 will function exactly the same as pin body 32. The clamping means 50 locks the blade sectors when finally adjusted against circumferential movement during operation. These dimensional relationships could be designed so the pins 14 could rotate in a direction opposite to that indicated by arrows 26.

The third embodiment of FIGS. 11 and 12 functions in a similar manner to the first and second embodiments just described. The pin 232 will follow a path of travel that is either arcuate or straight which will move it in a radial direction into contact with the radially innermost edge portion 20A of aperture 23 of the sector 17 when mounted thereon.

In a gang saw installation, the collar 1 will be secured on the arbor by set screws 11. To install the split saw blade sectors 17, 17A, the nut 51 will be partly unscrewed and washer 53 moved therewith far enough to create a space between the washer and the ends of pins 14 projecting from inner face 4. Each sector is placed into the collar with its set of apertures 23, receiving pins 14 loosely therethrough. The nut 51 is then hand tightened. In the first and second embodiments, a hexagonal wrench is then inserted in each of the heads 36 or 136 to rotate the cam body and move each pin 14 radially in or out in the direction of arrows 26 (FIG. 4) into contact with inner peripheries 24. In the third embodiment, the adjusting screws 258 are turned in or out to move each pin 14 radially in or out into contact with inner periphery 24 of the saw blade section. The contact between pins 14 and inner peripheries 24 causes the blade sectors to be moved radially in the direction of arrows 27 and adjusted into precise installed concentricity with the bore which will occur when each arcuate edge 18, 18A is forced into abutting contact with the outer peripheral surface or reference location 22 on the stub arbor 45. With both blade sectors 17, 17A so installed, the pins 14 can be individually moved relative to each other as required to adjust the sectors circumferentially relative to each other so that parallelism will exist between their facing straight line edges 15, 15A as shown in FIGS. 4 and 7. The hexagonal wrench will provide sufficient leverage to enable the installer to draw both saw blade sectors 17, 17A radially inward into very tight contact with the surface on shaft 45 to assure installed concentricity. The nut 51 is then fully tightened to compress the blade sectors 17 between the inner face 4 and the washer 53 and lock them in a precise installed concentricity which will be identical to the manufactured concentricity of the blade sectors. It would be possible to use only one adjusting means 30, 130 or 230 for each blade sector but the use of two adjusting means placed 90° apart will assure that the blade sector does not seesaw when being drawn inward in the direction of arrows 27 and forced into installed concentricity.

The preferred embodiment of the invention includes the stub arbor 45 on the collar flange 2. It would be possible to eliminate the stub arbor 45. In a no-stub arbor embodiment, the split saw blade sectors are dimensioned so that the inner edges 18 and 18A abut directly on the outer surface of the arbor 7 instead of on the stub arbor surface 22. The adjusting means 30 will force the inner edges 18 of the blade sectors into direct installed concentricity against the arbor 7 and the peripheral surface of the arbor 7 will take the place of reference surface 22. In the no-stub arbor collar, the clamping means 50 will comprise hardened cap screws, not shown, which are passed through a clamping washer similar to washer 53, through additional holes in the blade sectors and threaded into suitable internally threaded openings in the inner face of flange 2. The no stub arbor collar would function exactly the same as the stub arbor collar shown, with the only difference residing in the absence of the stub arbor and the use of cap screws as clamping means 50 for compressively locking the blade sectors against the inner face of the collar flange in place of the single large nut 51.

The present invention as disclosed above permits the installed concentricity of each sector to be achieved with the use of one reference location, i.e., by indexing the split blade inner arcuate edge 18 against the stub arbor reference location or location 22 which is coaxial with the arbor or against the arbor itself. If the blade sectors 17, 17A are assembled in the collar when it is not on the arbor the bore 6 can be used as a reference location and the sectors can be precisely adjusted into installed concentricity with the bore 6. The dimension and radial position of the stub arbor surface, the arbor surface or the bore constitutes a single reference location which can be precisely duplicated in every collar and the sharpening jigs used for new and resharpened split saw blades. The pins 14 only fit loosely into the sector apertures 23A and therefore the pins no longer constitute a reference location which must be precisely accomodated when manufacturing the collar and split saw blade. The use of radial adjustment means 30, 130 or 230 enables installed concentricity to duplicate the manufactured or resharpened concentricity of the split saw blade because the blade sectors can each be radially adjusted and forced into tight abutting relation with a single reference location, i.e., the surface of the arbor.

The collar as herein-described can be used to mount the sectors of any radially separable cutting tool concentrically on an associated arbor or can be constructed as a sharpening jig used to mount the sectors concentrically of the arbor in the sharpening machine. As the collar and the sharpening jig both use a single reference location that is precisely the same, it is possible to always achieve an installed concentricity for the tool sectors which is virtually the same as the manufactured or resharpened concentricity of the tool sectors.

While the invention has been disclosed with relation to a split saw blade, it can also be applied to collars for mounting other types of radially separable cutting tools such as shaper cutters.

The disclosed embodiments are by way of example and modification of these embodiments can be made by those skilled in the art without departing from the scope of the following claims.

What is claimed is:

1. A collar for detachably securing to an arbor that rotates about an arbor axis a rotary cutting tool of the type comprising a plurality of radially separable sectors that are cooperable to surround said arbor and have a sector axis coaxial with said arbor axis, each said sector having axially opposite faces, an outer peripheral edge, a radially inner edge for cooperation with a cylindrical reference surface concentric with said arbor axis, and a plurality of pin receiving holes therethrough extending from one to the other of said faces that are located radially outwardly from said inner edge of the sector and are spaced apart a substantial distance along said inner edge, said collar comprising:

A. an annular flange having a flange axis and a sector engaging surface that forces in one direction along said flange axis, said flange being securable to said arbor in coaxial relation thereto;
   B. a clamping means having a connection with said flange to be adjustably shiftable relative to said flange in said one axial direction and in the opposite axial direction, and having a clamping surface which opposes said sector engaging surface for cooperating therewith to clampingly engage said faces of the sectors to confine the sectors against displacement in said axial directions;
   C. said sector inner edge having at least two peripherally spaced apart indexing portions located at a radius from said sector axis equal to the radius of said reference surface and adapted for radial locating engagement therewith;
   D. a plurality of pins mounted in said annular flange, one for each of said pin receiving holes in each blade sector, each said pin
      having a pin axle that is maintained substantially parallel to said flange axis,
      being of a size to be loosely receivable in its pin receiving hole,
      projecting in said one axial direction beyond said sector engaging surface, and
      being movable towards and from said flange axis; and
   E. a plurality of adjusting means on said annular flange, one for each of said pins, each arranged for urging its pin radially towards said flange axis, said pins and adjusting means cooperating with said pin receiving holes of sectors engaging the collar to releasably force said indexing portions on the inner edge of the sectors into radial locating engagement with said reference surface and establish said outer peripheral edges in installed concentricity with said arbor axis.

2. The collar of claim 1, wherein said adjusting means for each said pin comprises a cam body having a cam axis that is parallel to said flange axis, said cam body being mounted on said flange for rotation about said cam axis, and said pin being mounted on said cam body with said pin axis laterally offset from said cam axis.

3. The collar of claim 1, wherein:

(1) said flange has, for each of said pins, a substantially radially extending slot wherein the pin is guidingly confined to substantially translatory movement in said radial directions; and
   (2) said adjusting means for each pin comprises a screw carried by said flange and having respective connections with the pin and with the flange that permit the screw to be rotatable relative to the pin and the flange, one said connections being a threaded connection.

4. The collar of claim 1 wherein said flange has a stub arbor of substantially smaller diameter than said sector engaging surface that projects in said one axial direction beyond said sector engaging surface and is concentric to said collar axis, and wherein said cylindrical reference surface is on said stub arbor.

5. The collar of claim 4 wherein said clamping means is substantially annular and wherein its said connection with the flange comprises an external thread on said stub arbor and a mating internal thread on said clamping means.

6. A collar for concentrically and detachably securing to an arbor rotatable about an arbor axis a rotary cutting tool comprising radially separable sectors cooperable to define a central aperture in which said arbor is receivable and a sector axis that coincides with said arbor axis, each said sector having axially opposite substantially flat and parallel faces, a concavely arcuate radially inner edge engageable against a reference surface concentric with said arbor axis, and pin receiving holes located radially outward from said inner edge and spaced apart a substantial distance along said inner edge, said collar comprising:

A. an annular flange having,
      a flange axis,
      a central bore therethrough wherein said arbor is closely receivable concentrically to said flange axis, and
      a flange surface normal to said flange axis that surrounds said bore and faces in one axial direction, for engagement by one of said faces on each of said sectors;
   B. a securement means on said collar, cooperable with said arbor, for fixing the collar against rotational and axial displacement relative to the arbor;
   C. a clamping means for axially clamping said sectors in engagement with said flange surface, having
      a clamping surface for opposing engaging the other of said surfaces on each of said sectors, and
      a screw threaded connection with said flange, said connection disposing said clamping means with its said clamping surface in opposition to said flange surface and providing for adjustment of the clamping means along said flange axis toward and from the flange;
   D. said arcuate inner edge of each sector being at a radius from said sector axis that is equal to the radius of said reference surface;
   E. a plurality of pins carried by said flange, one for each of said pin receiving holes, each said pin
      (1) being of a size to be loosely receivable in its pin receiving hole,
      (2) having a pin axis that is maintained substantially parallel to said flange axis,
      (3) projecting in said one axial direction beyond said flange surface, and (4) being movable relative to said collar in opposite radial directions towards and away from said flange axis; and F. A plurality of adjusting means on the collar, one for each of said pins, each said adjusting means providing for shifting of its pin in said opposite radial directions relative to the collar and for holding its pin in any position to which it may be so shifted to force said inner edges of the sectors into engagement with said reference surface and maintain said outer peripheral edges of the sectors in installed concentricity with said arbor axis.

7. The collar of claim 6, wherein said adjusting means for each said pin comprises a cam body having a cam axis substantially parallel to said flange axis, said cam body being concentric to said cam axis and mounted in said flange for adjusting rotation about said cam axis, each said cam body and its pin having ends, and the pin being mounted on the cam body in end-to-end relationship thereto with its pin axis eccentric to said cam axis of its cam body.

8. The collar of claim 6, wherein:

(1) said flange has a plurality of substantially radially extending slots, with one of said pins mounted in each slot and guidingly confined thereby to substantially translatory movement in said radial directions; and (2) said adjusting means for each pin comprises a screw having respective connections with the pin and with the flange that permit the screw to be rotated relative to the pin and flange, one of said connections being a threaded connection.

9. The collar of claim 6, wherein said flange has a hub portion projecting in said one axial direction, said cylindrical surface being on said hub portion.

10. The collar of claim 9, wherein:

said clamping element is annular and has an internal thread, and said hub portion includes an axially outer end portion having an external thread thereon that mates with said internal thread and cooperates with it to provide said screw threaded connection.

11. The collar of claim 6, wherein said cylindrical surface is on said arbor.

* * * * *